Aug. 28, 1962 W. R. JOHNSON 3,051,797

TRANSDUCING SYSTEM

Filed March 9, 1959 4 Sheets-Sheet 1

INVENTOR:
Wayne R. Johnson
By Smyth & Roston
Attorneys

Aug. 28, 1962 W. R. JOHNSON 3,051,797

TRANSDUCING SYSTEM

Filed March 9, 1959 4 Sheets-Sheet 2

INVENTOR:
Wayne R. Johnson
By Smyth & Roston
Attorneys

Aug. 28, 1962 W. R. JOHNSON 3,051,797

TRANSDUCING SYSTEM

Filed March 9, 1959 4 Sheets-Sheet 3

INVENTOR:
Wayne R. Johnson
By Smyth & Roston
Attorneys,

Aug. 28, 1962 W. R. JOHNSON 3,051,797
TRANSDUCING SYSTEM
Filed March 9, 1959 4 Sheets-Sheet 4

INVENTOR:
Wayne R. Johnson
By Smyth & Roston
Attorneys, 3,051,797

TRANSDUCING SYSTEM

Wayne R. Johnson, Los Angeles, Calif., assignor to Minnesota Mining and Manufacturing Company, St. Paul, Minn., a corporation of Delaware Filed Mar. 9, 1959, Ser. No. 798,192
10 Claims. (Cl. 179—100.2)

This invention relates to apparatus for recording and reproducing television signals and, more particularly, to apparatus for automatically correcting any misalignment between a magnetic tape and a recording and reproducing head utilized to record and reproduce television signals on the magnetic tape.

In my copending patent application, Serial No. 733,165, filed on May 5, 1958, there is disclosed and claimed a travelling wave transducer head for transversely recording wideband signals on successive transverse tracks of a longitudinally moving magnetic tape. By transversely recording information on the magnetic tape, the longitudinal movement of the tape may be materially reduced without reducing the reproducible band-width or attenuating the higher frequencies of the wideband signals.

The transducer head, which is stationary, is provided with a tubular shape disposed in a transverse direction across the tape. Transverse recording or reproducing is achieved even though the transducer head is stationary by exciting in the head longitudinal elastic waves which move transversely with respect to the longitudinal direction of the movement of the magnetic tape. The transducer head includes a tube which is magnetostrictive and the elastic waves momentarily relieve stresses normally in the tube so that, in effect, the elastic waves function as enabling waves by locally changing the permeability of the tube. A signal coil is coupled to the tube for transducing frequency modulated signals to be recorded and for reproducing frequency modulated signals recorded on the magnetic tape.

In order to accurately reproduce recorded signals, it is desirable that the position of the tape be accurately aligned with the position of the transducing head. Any misalignment or angular variation in the position of the magnetic tape relative to the transducer head, which is referred to as skew, causes the excited elastic waves in the head to pass at an angle to the transverse tracks. When skew exists so that the paths of the elastic waves are at an angle to the transverse tracks, cross-talk from adjacent channels occurs. Cross-talk is a term utilized to indicate distortion or interference due to the reproduction of signals recorded on adjacent tracks of the magnetic tape. Along the path of the elastic wave, when the wave is furthest from the centerline of one transverse track, it is closer to one of the adjacent tracks so that signals recorded in the adjacent track are reproduced.

The dimensions of the tracks are quite small so that even minute misalignment or skew of the magnetic tape results in cross-talk. The width of a transverse track, for example, may be 0.1 mil and the spacing between centerlines of adjacent tracks may be 0.2 mil. Moreover, even if skew is completely absent when the tape is being reproduced, cross-talk results if skew is present when the tape is recorded. Cross-talk results because the skew in the recording sequence causes the angle of the transverse recorded tracks to vary so that upon reproduction the tracks are misaligned with respect to the transverse waves in the magnetostrictive tube. The combined skew may be considered as the difference of the instantaneous angles of the tape and of the transverse tracks for the recording and reproducing sequences. The amount of cross-talk which may be considered as noise or unwanted signals from adjacent tracks is, therefore, dependent upon the combined skew for both recording and reproducing sequences. Some skew is unavoidable so that unwanted signals for adjacent tracks are usually present.

In one specific embodiment of this invention, the skew of the magnetic tape is compensated for by automatically adjusting the position of the transducing head in accordance with variations of the skew of the tape. During the recording sequence, at the same time that the wide band signals are recorded in the transverse tracks on the magnetic tape, synchronizing pulses derived from the wide band signals are recorded along both edges of the magnetic tape. Though, effectively, the magnetic tape includes three longitudinal tracks, one for the wide band signals and one along each edge for the synchronizing pulses, the two synchronizing tracks may actually be recorded over the transverse tracks along the edges of the tape.

When the wide band signals are reproduced, synchronizing pulses concurrently reproduced from the tracks along the edges of the magnetic tape are introduced to a phase detector which recognizes any variation in the phase between the two sets of synchronizing pulses. The phase detector provides an adjusting signal having a magnitude related to the magnitude of the phase displacement and the polarity related to the direction of the phase displacement. The adjusting signal is utilized to rotate or pivot the transducer head to compensate for the skew of the tape. The transducer head is pivotably mounted at one end and affixed by a piezoelectric crystal at its other end to a fixed supporting member.

The adjusting signal from the phase detector is introduced to the crystal, which expands or contracts in accordance with the polarity of the adjusting signal and by an amount in accordance with the magnitude of the adjusting signal. The position of the transducer head is, in this manner, varied to realign the position of the transducer head relative to the tape for the composite skew of both recording and reproducing sequences. The two magnetic heads, which record and reproduce the synchronizing pulses along the edges of the tape, are pivotally mounted with the transducer head so that the phase displacement between the two sets of synchronizing pulses is compensated by the adjusting signal.

In another specific embodiment of this invention, three recording and reproducing windings are provided as part of the transducer head so that one multiwinding transducer head is utilized instead of the two synchronizing magnetic heads and the transducer head. The sets of synchronizing pulses to be recorded on the two longitudinal tracks along the edges of the tape are timed to successively coincide with the elastic waves in the magnetostrictive tube as the waves pass through the tube adjacent the edges of the magnetic tape. The synchronizing windings each occupy only a short longitudinal section of the transducer head and the three tracks do not overlap. When the synchronizing pulses are reproduced, a delay is provided for one of the sets of pulses to compensate for the difference in time in reproducing signals along the two edges of the tape by the transverse elastic waves.

Other features of this invention relate to the provision of means for adjusting the instantaneous speed of the tape as well as for adjusting the position of the transducer head to compensate for tape skew. The pulses derived from the one of the two longitudinal synchronizing tracks are utilized for both functions.

Further advantages and features will become apparent upon consideration of the following description in conjunction with the drawing wherein.

Figure 1:
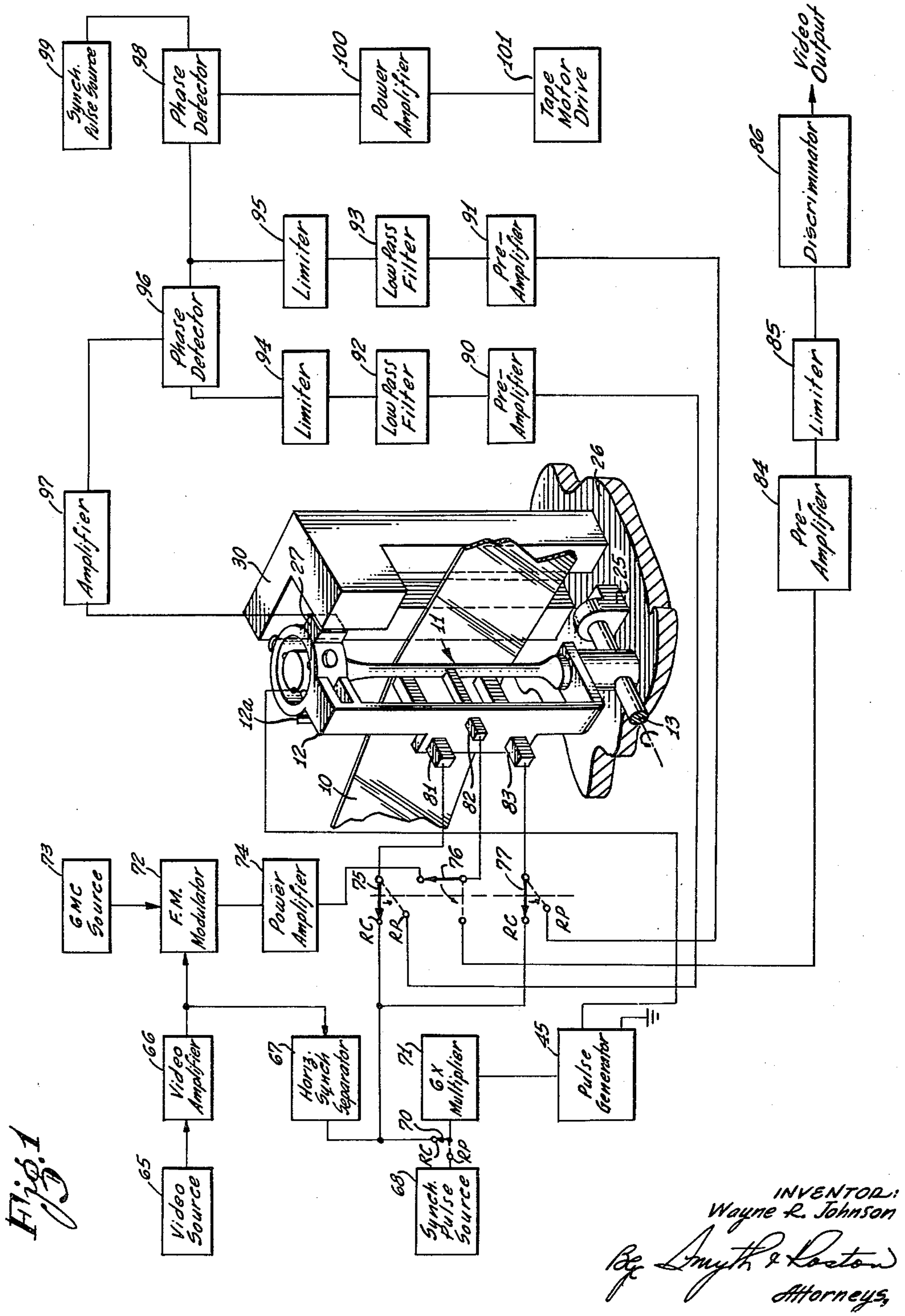
FIGURE 1 is a circuit representation of one embodiment of the transducing system of this invention including a perspective view of the transducer head and the magnetic tape.
Figures 2, 3:
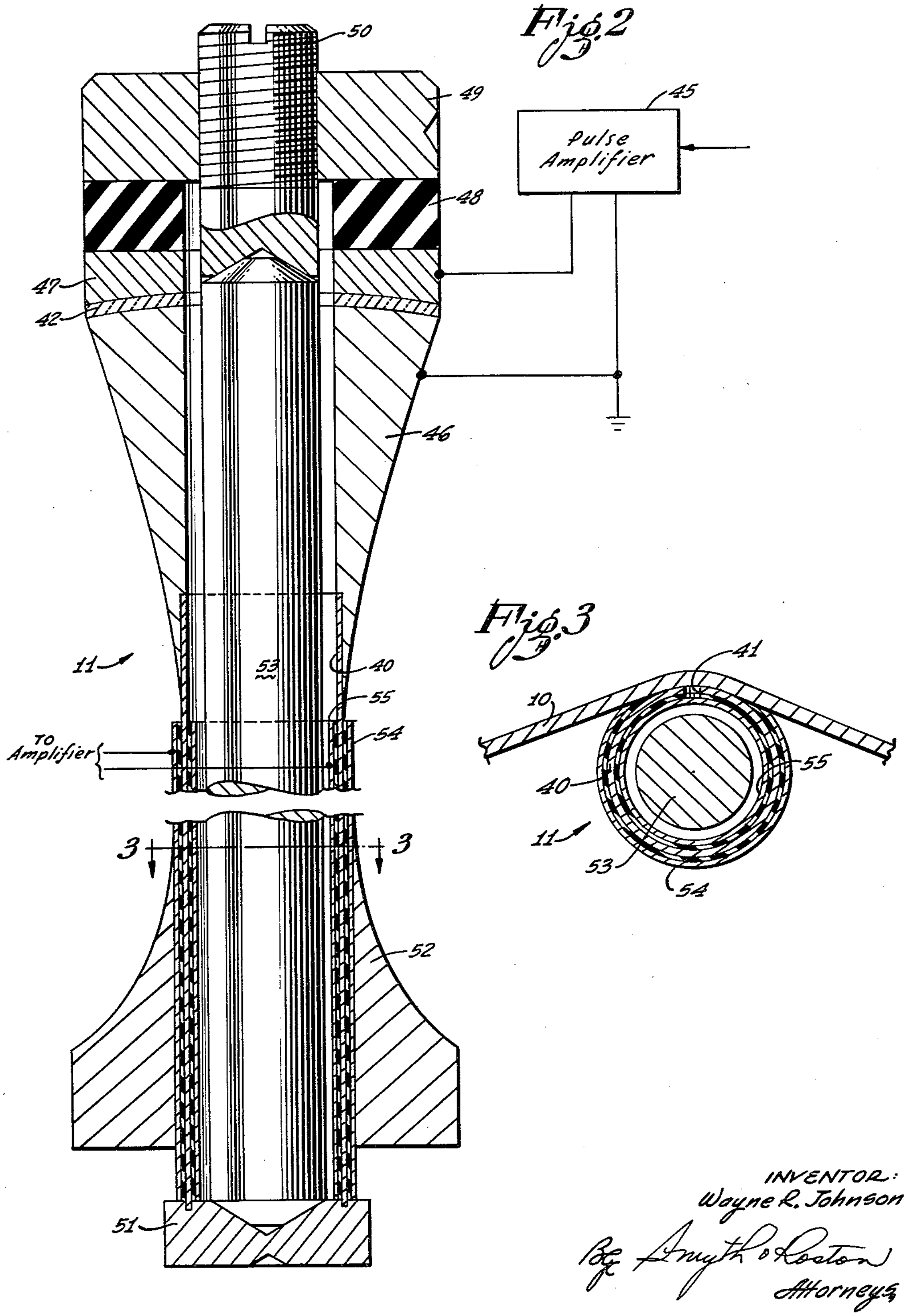
FIGURE 2 is a longitudinal sectional view of the transducer head utilized in the one embodiment of the transducing system of this invention.
FIGURE 3 is a sectional view of the transducer head taken through line 3—3 of FIGURE 2.
Figure 6:
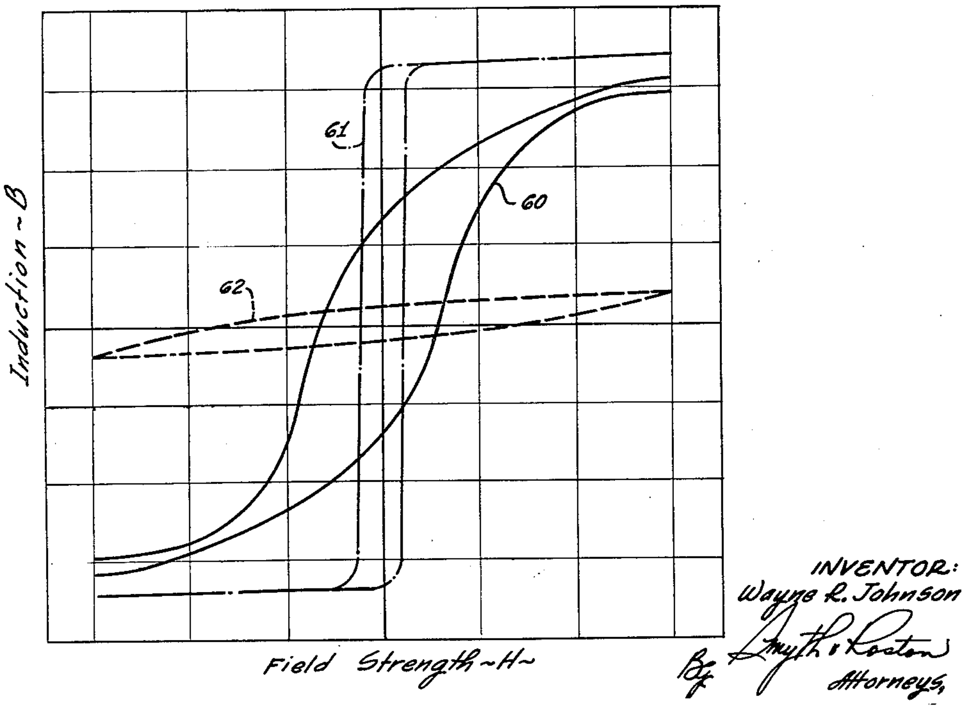
FIGURE 6 is a series of curves illustrating the magnetic properties of the magnetostrictive tube material under tension and as affected by an elastic wave.

The transducing system of this invention, which is shown in FIGURE 1, is utilized to correct any misalignment of a tape 10 relative to the position of a travelling wave transducer head 11. The misalignment, which is a variation in the angular position of the tape relative to the head 11 as it moves adjacent the head 11, as indicated above, is referred to as skew. The travelling wave transducer head 11, which is briefly hereafter described herein in reference to FIGURES 2, 3 and 6, is described in detail in my copending patent application. Serial No. 733,165, filed on May 5, 1958.

Figure 5:
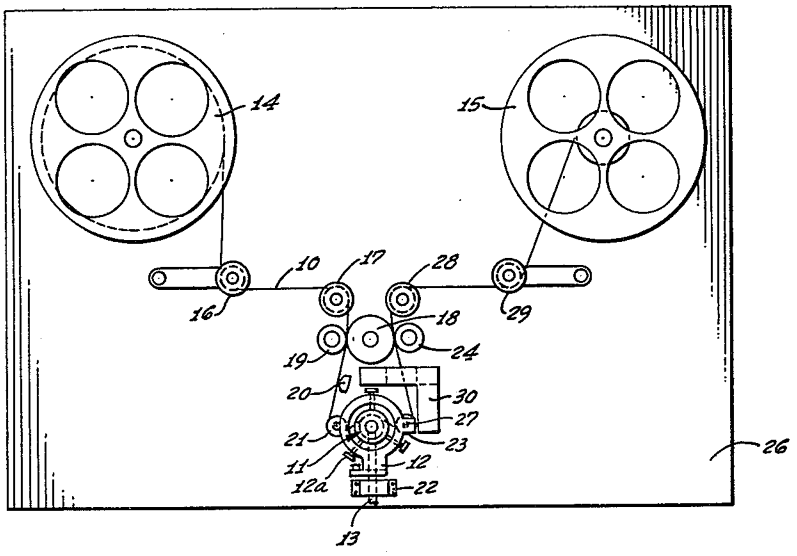
FIGURE 5 is a schematic diagram of equipment for progressing the magnetic tape adjacent the travelling wave transducer head utilized in the transducing system of this invention.

The tubular shaped transducer head 11 is supported by a bracket 12 which is attached at one end to a rotatable shaft 13. The shaft 13, which is also shown in FIGURE 5, is rotatably supported by two bearings 22 and 25. The bearings 22 and 25 are mounted on a panel 26 which also supports the tape transport equipment for moving the tape 10 adjacent to the transducer head 11. With the shaft 13 rotatable, the bracket 12 and transducer head 11 are rotatable therewith about the longitudinal axis of the shaft 13.

The upper end of the bracket 12, which has three screws 12*a* for manually adjusting the position of the transducer 11 relative to the bracket 12, is attached by a piezo-electric crystal 27 to a structural member 30. The crystal 27, which may, for example, be barium titanate, is physically bonded to the bracket 12 and the member 30. The bonding material may, for example be an epoxy resin. It is evident that any expansion or contraction of the crystal 27 will pivot the bracket 12 and the transducer head 11 therewith about the longitudinal axis of the shaft 13. When the crystal 27 expands the head 11 is rotated in a counter clockwise direction as shown in FIGURE 1 and when the crystal 27 contracts, the head rotates in a clockwise direction. This particular arrangement for supporting the transducer head 11 is utilized, as is further hereinafter described, as part of an automatic compensating system which corrects for the skew of the tape 10 when information is being reproduced.

Referring to FIGURE 5, the tape transport equipment for processing the magnetic tape 10, adjacent to the transducer head 11 is shown in highly diagrammatic form. The transducer head 11 records and reproduces information on successive transverse tracks across the magnetic tape 10. The magnetic tape 10 is driven from a pay-out reel 14 adjacent the transducer head 11 and rewound on a take-up reel 15. The magnetic tape 10 may be tensioned by individual motors, not shown, which drive the pay-out reel 14 and the take-up reel 15.

From the pay-out reel 14, the magnetic tape 10 passes over a spring actuated tensioning arm 16 about which it turns a substantially right angle to pass over a guide post 17. At the post 17, the magnetic tape 10 again makes a right angle turn to pass between a drive capstan 18 and a rubber nip-roller 19 and then against a cleaning device 20 to another guide post 21. The post 21 directs the magnetic tape 10 over the transducer head 11 at a particular angle relative to the periphery of the transducer head 11. The magnetic tape passes from the head 11 to the reel 15 along a path which is substantially the image of the path from the reel 14 to the head 11. The path from the transducer head 11 is over a post 23 between a nip-roller 24 and the drive capstan 18, post 28 and the spring actuated tension arm 29 to the take-up reel 15.

The drive, therefore, for the magnetic tape 10 is a tight loop drive wherein the speed of the magnetic tape 10 is dependent primarily upon the peripheral speed of the drive capstan 18. Transverse movement of the tape 10 relative to the panel 26 which results in skew is usually due to the fact that the tape 10 is slightly misaligned on the reel 14. Skew may occur in either a recording or a reproducing sequence.

As shown particularly in FIGURES 2 and 3, the transducer head 11 includes a tube 40 of magnetostrictive material which changes its magnetic properties with stress. The magnetostrictive tube 40 which may be made of "permalloy" tape has a non-magnetic gap 41 extending longitudinally along the tube 40. Elastic waves are transmitted longitudinally through the magnetostrictive tube 40 by a piezoelectric crystal 42 responsive to voltage pulses developed by a pulse amplifier 45. The pulses developed by the amplifier 45 are 0.1 microsecond in duration and have a repetition period which is slightly less than that required to transmit an elastic wave or acoustic pulse through the magnetostrictive tube 40.

At one end of the magnetostrictive tube 40, an acoustic transformer section 46 is mounted to couple acoustic waves generated by the piezoelectric crystal 42 to the magnetostrictive tube 40. The other side of the crystal 42 is attached to an annulus 47 which functions as a buttress against which the crystal 42 acts to deliver pulsed energy developed thereby to the acoustic transformer section 46. The annulus 47 is in turn backed by an annulus 48 of insulating material which is a good absorber of sound. The absorbent annulus 48 is in turn secured to a metal cap or nut 49 which is internally threaded to receive an adjusting screw 50.

At the opposite end of the magnetostrictive tube 40, a cap 51 and an acoustic absorbent section 52 is mounted. The waves generated from the crystal 42 are transmitted or propagated through the acoustic transformer section 46 and the magnetostrictive tube 40 to the absorbing section 52. The structure including the magnetostrictive tube 40 is placed in tension by means of a strut 53 extending longitudinally through the tube 40 and bearing at one end in a depression formed in the inner end of the adjusting screw 50 and at the other end in a similar depression in the cap 51.

The effect of the stresses applied to the magnetostrictive tube 40 due to the acoustic waves from the piezoelectric crystal 42 are illustrated in FIGURE 6. In FIGURE 6, the hysteresis loop 60 is that of the unstressed tube 40 and the slope of the loop represents its permeability. When the tube 40 is stressed longitudinally due to the effect of the nut 49 on the adjusting screw 50, the shape of the hysteresis loop is changed materially to that of the hysteresis loop 61. The hysteresis loop 61 is nearly rectangular in form having a very steep slope almost to the point of saturation. Circumferentially, however, the effect of the tension causes the slope of the hysteresis loop or the permeability of the tube 40 to approach zero as indictated by the loop 62. In other words, the magnetostrictive tube 40 acts as though it were non-magnetic to circumferential fields. Circumferential fields are induced by a signal winding including the plated sections 54 and 55 which are plated on the exterior and interior respectively of the magnetostrictive tube 40.

A relaxation of the stress in the tube 40 causes the permeability to change back towards its normal condition as indicated by the curve 60. The acoustic waves or elastic pulses which are generated by the piezoelectric crystal change the permeability or positions of the tube 40 along the wave due to the momentary relaxation of the stress. In this manner, the acoustic wave changes the condition of successive positions along the tube 40 from being effectively non-magnetic to being effectively magnetic. When the wave passes, the positions return to their normal effectively non-magnetic condition determined by the applied stresses.

During the time that an acoustic wave is transmitted longitudinally through the magnetostrictive tube 40, a signal current applied to the plated windings 55 and 54 is effectively recorded on the magnetic tape 10 which is positioned against the gap 41 in the tube 40. As the tape 10 is progressed along its longitudinal axis adjacent the magnetostrictive tube 40 of the transducing head 11, the successive acoustic waves through the tube 40 cause the signals introduced to the windings 54 and 55 to be recorded as successive transverse tracks on the magnetic tape 10 which are illustrated in FIGURE 4.

Figure 4:
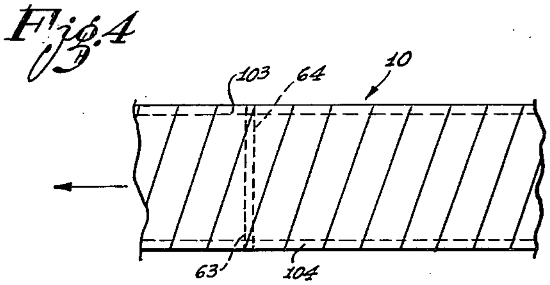
FIGURE 4 is a diagrammatic representation of a section of the magnetic tape illustrating on an exaggerated scale the relative positions of successive transverse tracks with respect to the instantaneous position of the recording gap formed therealong for successive elastic waves and the position of the two synchronizing tracks.

In FIGURE 4, the virtual recording gap of the head 11 towards the termination of one transverse track is indicated at 63 and at the beginning of the next transverse track at 64. The spacing of the two gaps 63 and 64 indicates that some of the information at the end of one track is repeated in the beginning of the next track.

If any tape skew or misalignment exists, the angle of the virtual recording gap is different and the elastic waves through the tube 40 are not parallel to the transverse tracks which are to be reproduced. FIGURE 1 illustrates a transducing system which is effective when transversely recorded signals are reproduced for continuously compensating for any tape skew or misalignment. Before proceeding with a description of the reproducing sequence, the sequence for recording wide band signals is described with reference also to FIGURE 1.

The transducing head 11 functions to record wide band signals on the tape 10 when four switches 70, 75, 76 and 77, shown in the FIGURE 1 are in their recording position. When the switches 70, 75, 76 and 77, which may be ganged, are moved to their reproducing positions indicated by the dash lines, the transducer head 11 functions to reproduce signals previously recorded on the magnetic tape 10.

The wide band signals may be video signals produced by a transmitter or other source 65. The video signals are introduced to a video amplifier 66 which amplifies the signals to correct for any variations in the level of the video signals from the source 65. Conventional television signals include horizontal synchronizing pulses having a repetition rate of 15,750 pulses per second which are utilized to synchronize the television receiver with the television signals. The synchronizing pulses are separated from the television signals from the amplifier 66 by a horizontal synchronizing separator 67 which may be of the type utilized in commercial television receivers.

With the switch 70 set at its recording position, as shown in FIGURE 1, the separated synchronizing pulses derived from the video signals are introduced to a frequency multiplier circuit 71. The multiplier circuit 71 provides pulses at a repetition rate which is six times the repetition rate of the synchronizing pulses or at a rate of 94.5 kilocycles. The pulses from the multiplier circuit 81 are introduced to the pulse generator 45, which as briefly described above, excites the crystal 42 (FIGURE 2) of the transducer head 11. In this manner, the elastic waves are generated in the tube 11 at a repetition rate which is six times the horizontal synchronizing frequency of the video signals. Because of this ratio, six transverse tracks are utilized to record one horizontal line of the video signals.

The synchronizing pulses from the separator 67 are also introduced respectively through the switches 75 and 77 in parallel to two magnetic toroidal heads 81 and 83 which are also mounted on the pivoted bracket 12. The heads 81 and 83 record the horizontal synchronizing pulses along narrow tracks 103 and 104 (FIGURE 4) at the respective edges of the tape 12. One pulse may be recorded in each of these tracks for every six transverse tracks on the tape 10. As is hereinafter described, during the reproducing sequence the two tracks 103 and 104 are utilized to recognize and compensate for any misalignment of the tape 10 with respect to the transducer head 11.

The video signals including the synchronizing pulses from the amplifier 66 are frequency modulated by a modulator 72 on a 6 megacycle carrier from the source 73. The frequency modulated signals from the modulator 72 are introduced through a power amplifier 74 and the switch 76 to the toroidal winding 82 which is coupled to the transducer head 11. The winding 82, which is connected to the plated windings 54 and 55 shown in FIGURE 2 of the transducer head 11, may be a separate winding which effectively increases the response of the windings 54 and 55.

In this manner, the frequency-modulated signals are introduced to the transducer head 11 and recorded in transverse tracks on the tape 10. Periodically at each sixth transverse track, as the frequency modulated signals are recorded, synchronizing pulses are recorded respectively in the tracks 103 and 104.

When the recorded information is to be reproduced, the switches 70, 75, 76 and 77 are changed to their reproducing positions shown by the dash lines. The elastic waves in the transducer head 11 are now generated by pulses supplied from a synchronizing pulse source 68 instead of by pulses derived from video signals. The pulse source 68 supplies synchronizing pulses to the multiplier circuit 71, which operates the pulse generator 45 at the repetition rate of 94.5 kilocycles. The generator 45 excites the crystal 42 in the head 11 to generate the elastic transverse waves. The frequency modulated signal is coupled from the transducer head 11 through the toroidal winding 82, switch 76 and a preamplifier 84 to a limiter 85. The limiter 85 introduces a constant amplitude frequency modulated signal to the discriminator 86 which removes the 6 megacycle signal and provides video signals which are substantially the same as those introduced from the video source 65 to the transducer head 11.

The synchronizing pulses from the track 104 are introduced from the winding 83 through the switch 77 and a preamplifier 91 to a low-pass filter 93. The low-pass filter 93 rejects frequencies substantially over 25 kilocycles so that any reproduced frequencies at 94.5 kilocycles or at 6 megacycles are removed. The output of the low-pass filter 93, is, therefore, pulses at a nominal frequency of 15,750 pulses per second. The synchronizing pulses from the filter 93 are introduced through a limiter 95 to two phase detectors 96 and 98.

The phase detector 96 compares the phase of the pulses reproduced from track 104 with those reproduced from the track 103. The path for the pulses from the winding 81 is substantially similar to the path for the pulses for the winding 83 being through the switch 75, a preamplifier 90, a low-pass filter 92, and a limiter 94. Any difference in phase between the two sets of pulses from the tracks 103 and 104 is recognized by the phase detector 96 which introduces an error signal in accordance therewith to an amplifier 97. Phase displacement between the sets of pulses from the two tracks 103 and 104 occurs when the angular position of the tape 10 with respect to the transducer head 11 is different during the recording and reproducing sequences. In other words, any skew either during the recording or the reproducing sequence will cause the phase displacement of the pulses reproduced from the two tracks 103 and 104. The amplifier 97 introduces a variable direct potential to the crystal 27 which, as described above, supports the pivoted bracket 12 against the supporting member 30.

The transducer head 11 is insulated from the bracket 12 so that the variable direct potential introduced to the crystal 27 does not affect the operation of the head. The variable direct potential is introduced to one face of the crystal 27, the opposite face of which is grounded through the bracket 12. Any change in potential across the crystal 27 causes its dimensions to change. This in turn causes the bracket 12 to rotate through a small angle about the longitudinal axis of the shaft 13.

The size and material of the crystal 27 determines the angle of rotation of the transducer head 11. For example, if a thicker crystal is utilized, the angular displacement corresponding to a change in potential is increased in accordance therewith. When the crystal 27 is barium titanate, a width of approximately 0.5 inch provides for sufficient angular displacement of the bracket 12 to compensate for the usually encountered skew.

As the bracket 12 is rotated by the expansion or contraction of the crystal 27, the transducer head 11 and also the heads 81 and 83 rotate therewith. The rotation of the heads 81 and 83 does not interfere with the reproduction of the signals recorded in tracks 103 and 104 as their recording and reproducing gaps are relatively wide compared to their movement due to the change in dimension of the crystal 27.

To illustrate the skew-compensating effect by the movement of the transducer head 11, consider for example that the tape 10 in FIGURE 1 moves to the left adjacent the head 11. By way of further illustration, the combined skew may be such that the phase of the reproduced synchronizing pulses from track 103 along the top edge of the tape 10 leads the phase of the reproduced synchronizing pulse from track 104 along the bottom edge of the tape 10. This skew condition occurs during the reproducing sequence when the tape 10 is tilted downwardly to the left so that the upper track 103 is advanced with respect to the lower track 104. The same phase advancement of the pulses from the upper track may occur even when the tape 10 is perfectly aligned with the head 11 during the reproducing sequence if the tape 10 is tilted upward to the left during the recording sequence. If the angular position of the tape is the same for both recording and reproducing at any position on the tape, the combined skew is zero.

With the pulses from track 103 being phase-advanced with respect to the pulses from track 104, the magnitude of the variable direct potential from the amplifier 97 is increased to proportionately expand the crystal 27. As the crystal 27 expands, it rotates the bracket 12 and the transducer head 11 through a minute counter-clockwise angle. The portion of the head 11 adjacent the upper track 103 is in this manner advanced in the direction of the movement of the tape 10 to correct the misalignment of the tape 10.

As described above, the synchronizing pulses reproduced from the track 104 are introduced to a phase detector 98 as well as to the phase detector 96. The other input to the phase detector 98 is from a synchronizing pulse source 99, which supplies pulses at a constant rate of 15,750 pulses per second. Any change in phase of the pulses from the track 104 is indicative of an instantaneous variation in the speed of the tape 10. The change in phase of the synchronizing pulses with respect to the pulses from the source 99 is detected by the phase detector 98 which adpusts the power supplied to a tape motor drive 101 from a power amplifier 100. If the phase of the synchronizing pulses from the track 104 advances with respect to the phase of the reference pulses, it indicates that the speed of the tape 10 has increased. The power to the motor drive 101 is, therefore, reduced to correct the speed variation. In this manner, the signals from the track 104 serve a dual function in that they are utilized both to correct for any tape skew and also to correct for any instantaneous variations in speed.

In the embodiment shown in FIGURE 1, and described above, the bracket 12 supports three separate transducer heads 11, 81 and 83. In the embodiment of this invention, shown in FIGURES 7 and 8, a multiwinding travelling wave head **11*a* may be utilized instead of the three heads 11, 81 and 83. In my copending patent application, Serial No. 733,045, filed on May 5, 1958, there is described a transducer head 11*a* shown in FIGURE 7 which may have three separate windings 115, 116 and 117 which are coupled to the magnetostrictive tube 40*a*. Surrounding the magnetostrictive tube 40*a* are three coupling rings 111, 112 and 113, which function as the recording and reproducing winding. The rings 111, 112 and 113 do not completely encircle the tube 40*a* to permit the magnetic tape 10 to engage a short portion thereof. Each of the rings 111, 112 and 113 has a number of branches or loops in parallel constituting together a single turn winding when connected by the short portion of the cylindrical tube 40*a*. In this manner, each of the rings 111, 112 and 113 forms effectively a separate recording and reproducing winding for the magnetostrictive tube 40*a*. If the windings 54 and 55**, shown in FIGURE 2, are divided into three longitudinal sections with separate connections provided to each, a similar result is obtained.

Figure 7:
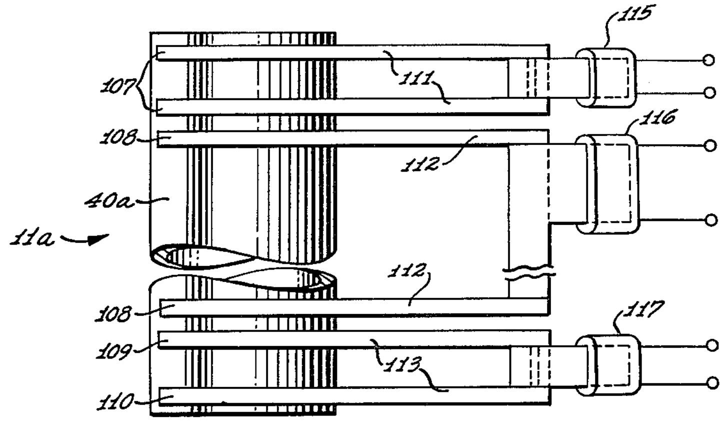
FIGURE 7 is a top view of another transducer head which is utilized in a second embodiment of the transducing system of this invention.
Figure 8:
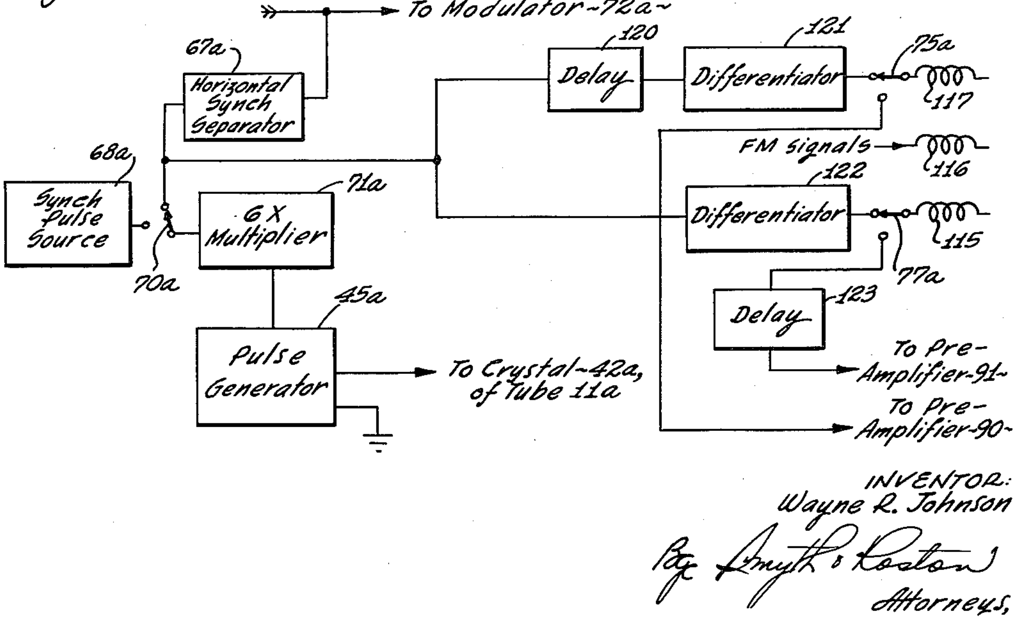
FIGURE 8 is a partial circuit representation of the second embodiment of this invention, including, a perspective view of the transducer head in the magnetic tape.

When a transducer head, such as head **11*a***, having three windings is utilized, the circuit arrangement shown in FIGURE 8 which is a modification of the arrangement shown in FIGURE 1, may be utilized therewith to correct for tape skew and tape speed variations. The components shown in FIGURE 8 which are similar to the components shown in FIGURE 1 have the same reference number with the addition of a suffix *a*. During the recording sequence, the horizontal pulse separator **67*a* provides the synchronizing pulses to a delay circuit 120 and to a differentiator circuit 122 instead of directly to the heads 81 and 83. The delay circuit 120 delays the synchronizing pulses by an interval which is slightly shorter than the transit time of an elastic wave across the tube 40*a*. The delayed pulses from the circuit 120 are provided to a differentiator circuit 121 which is similar to a differentiator circuit 122. The output of the differentiator circuits 121 and 122 are provided through the switches 75*a* and 77*a* to the windings 117 and 115 which were described above in reference to FIGURE 7. The delay circuit 120 effectively synchronizes the pulses provided by the windings 115 and 117 with the elastic waves so that, when the elastic wave passes first adjacent the winding 115, it records on a lower track on the tape one synchronizing pulse and thereafter towards the end of the transverse track it records a second synchronizing pulse in an upper track of the tape adjacent winding 117. The delay circuit 120 as indicated above, provides for a delay interval which is slightly less than the transit time of an elastic wave so that the delayed synchronizing pulse arrives at the winding 117 substantially at the same time that the elastic wave passes through the tube 40*a* adjacent to the winding 117. A delay is not provided for the pulses to the winding 115 because the pulse energizes the winding 115 during the time an elastic pulse passes adjacent the winding 115**.

The synchronizing tracks on the tape do not overlap the information signals as illustrated in FIGURE 4 but are separate distinct tracks. Due to the repetition of a portion of the information at the beginning of each track with information at the end of a preceding track, as described above in reference to FIGURE 4, the timing of the classic waves need not be changed though a slightly wider tape is utilized. The embodiment of the invention, as illustrated in FIGURES 7 and 8, functions therefore in a manner similar to that described above in reference to FIGURE 1 except that a slightly wider tape is utilized to provide three separate non-overlapping tracks.

When the information recorded on the wide tape is to be reproduced, switches 70*a*, 75*a* and 77*a* are moved to their reproducing positions. A delay is now provided for the signals reproduced by the winding 117 to synchronize them with the signals reproduced by the winding 117. The delay provided by the circuit 123 is equal to the delay provided by the circuit 120. The signals from the windings 117 and 115 are provided to the preamplifiers 90 and 91 shown in FIGURE 1, with the rest of the skew and speed compensating system being similar to that described above in reference to FIGURE 1.

Although this invention has been disclosed and illustrated with reference to particular applications, the principles involved are susceptible of numerous other applications which will be apparent to persons skilled in the art. For example, the synchronizing pulses need not be derived from the input wide band signals, as a separate source such as source 68 may be utilized during the recording sequence for the providing the synchronizing pulses. Moreover, it is evident that the angular position of the tape may be adjusted instead of the position of the head to compensate for the skew. The invention is, therefore, to be limited only as indicated by the scope of the appended claims.

I claim:

1. In a system for transversely recording on and reproducing relatively high frequency information signals from a longitudinally moving magnetic tape, transverse recording and reproducing means positioned adjacent said magnetic tape for transversely recording the information signals across said tape and for reproducing transversely recorded information signals, a first and a second magnetic head positioned adjacent said tape for recording relatively low frequency reference signals along the edges of said tape over the transversely recorded information signals, means including said first and said second magnetic heads for reproducing any signals recorded along the edges of the magnetic tape and for separating the reference signals from the rest of the signals reproduced thereby, means for pivotally supporting said transverse recording and reproducing means so that its angular position is adjustable relative to the magnetic tape, means coupled to said reproducing and separating means for recognizing any misalignment due to a variation in the position of the tape relative to said transverse recording and reproducing means, means coupled to said means for pivotally supporting said transverse recording and reproducing means and to said recognizing means for pivoting said transverse recording and reproducing means on said supporting means by an amount and direction related to the recognized misalignment, and circuit means electrically coupled to said transverse recording and reproducing means for separating said information signals from the rest of the signals reproduced thereby.

2. In a system for transversely recording on and reproducing information signals from a longitudinally moving magnetic tape, transverse recording and reproducing means positioned adjacent said magnetic tape for transversely recording the information signals across said tape and for reproducing transversely recorded information signals, means electrically coupled to said transverse recording and reproducing means for controlling said transverse recording and reproducing means to initiate the recording of transverse tracks at a particular repetition rate, transducer means positioned adjacent said tape for recording reference pulses along the edges of said tape, means coupled to said transducer means and synchronized with said controlling means for introducing reference pulses to said transducing means at a repetition rate related to the repetition rate of initiating the recording of transverse tracks on the tape, means including said transverse recording and reproducing means and said transducer means for reproducing said information signals and said reference pulses and for separating said information signals and said reference pulses, and means coupled to said reproducing means for recognizing any misalignment of said tape with respect to said transverse recording and reproducing means.

3. In a system in accordance with claim 2, in addition, means for pivotally supporting said transverse recording and reproducing means so that its angular position is adjustable relative to the magnetic tape, and means coupled to said recognizing means for pivoting said transverse recording and reproducing means on said supporting means by an amount and direction related to the recognized misalignment.

4. In a system for transversely recording on and reproducing information signals from a longitudinally moving magnetic tape, transverse recording and reproducing means positioned adjacent said magnetic tape for transversely recording the information signals across said tape and for reproducing transversely recorded information signals, said means including three windings at different transverse positions across the tape, means coupled to the centrally located one of the three windings for introducing the information signals for recording, pulse generator means electrically coupled to said transverse recording and reproducing means for controlling said transverse recording and reproducing means to initiate the successive transverse tracks on the tape at a particular repetition rate, and circuit means electrically coupled to the two outside ones of said three windings and synchronized with said controlling means for introducing reference pulses to the two outside windings at a repetition rate related to the repetition rate of initiating the successive transverse tracks, said circuit means including delay means coupled to one of the two outside windings for delaying the reference pulses thereto for a particular interval related to the interval for recording one transverse track across the tape.

5. In a system for reproducing information recorded on a longitudinally moving tape in a pair of tracks displaced on the tape in a direction transverse to the direction of movement of the tape, transducer means disposed relative to the tape in the transverse direction for reproducing the information recorded in the pair of tracks on the tape upon an enabling of the transducer means, means pivotably supporting said transducer means for pivotable movement in the longituidnal direction, means operatively coupled to the transducer means for obtaining periodic enablings of the transducer means, means disposed relative to the tape and responsive to the periodic enablings of the transducer means for detecting variations in the presentation of the information in one of the tracks on the tape to the transducer means in the longitudinal direction at successive positions in the direction of movement of the tape relative to the presentation of the information in the other track on the tape to the transducer means in the longitudinal direction, and control means coupled to said detecting means and responsive to detected variations in the presentation of the information in the pair of tracks on the tape to the transducer means in the longitudinal direction at successive positions along the transducer means and mechanically coupled to the transducer means at the pivotable end of the transducer means for obtaining pivotal movements of said transducer means through an angle related to such detected variations.

6. The combination set forth in claim 5 in which the control means includes a crystal having a dimension variable with detected variations in the presentation of the information in the pair of tracks on the tape to the transducer means in the longitudinal direction at successive positions along the transducer means to vary the pivotable disposition of the transducer means.

7. In a system for transversely recording on and reproducing information from a pair of transversely displaced tracks on a longituidnally moving tape, transducer means positioned adjacent the tape in the transverse direction and constructed to be periodically enabled for the transfer of information between the tape and the transducer means at successive positions in the transverse direction upon each such enabling, means coupled to the transducer means for periodically introducing enabling pulses to the transducer means to obtain a transducing action between said tape and said transducer means at successive transverse positions along the tape, means pivotally supporting said transducer means so that its angular position is adjustable relative to the tape in the longitudinal direction at the successive positions along the transducer means, means including said transducer means and disposed relative to the tape and responsive to the periodic enabling of the transducer means for reproducing the information in the pair of transversely displaced tracks on the tape, means responsive to the information reproduced from the transversely displaced tracks on the tape for recognizing any misalignment of the transducer means relative to such tracks as a result of a variation in the longitudinal position of the tape relative to said transducer means, and means electrically coupled to said recognizing means and mechanically coupled to said transducer means for pivoting said transducer means on said supporting means through an angle and in a direction related to the magnitude and direction of the recognized misalignment.

8. In a system for transversely recording on and reproducing information from a pair of longitudinal tracks transversely displaced relative to each other on a longitudinally moving tape, transducing means positioned in a transverse direction adjacent the tape relative to the direction of movement of the tape and constructed to provide a transducing action at successive transverse positions along the tape upon an enabling of the transducer means, means pivotally supporting said transducer means so that the angular position of such transducer means is adjustable relative to the tape in the longitudinal direction at the successive positions along the transducer means, means including said transducer means for recording reference signals in the pair of longitudinal tracks at displaced positions in the transverse direction on the tape, means including said transducer means for using such reference signals to periodically enable such transducer means for the generation of signals transversely in the longitudinal tracks of the tape, means coupled to said transducer means for producing electrical signals corresponding to the reference signals recorded on the longitudinal tracks on the tape and for producing such reference signals upon the successive enablings of the transducer means, a phase detector coupled to said last mentioned means and responsive to the reference signals reproduced from the pair of longitudinal tracks on the tape for providing an error signal related to the phase displacement between such reference signals, and means coupled to said last mentioned means for adjusting the transverse angular position of said transducer means on said supporting means through an angle and in a direction dependent upon the magnitude and polarity of the error signal from said phase detector.

9. In a system for recording and reproducing information signals in a pair of transversely displaced tracks on a recording medium movable in a longitudinal direction, transducer means adjustably disposed relative to the recording medium in the transverse direction for recording the information signals in the pair of transversely displaced tracks on the recording medium upon successive enablings of the transducer means and for reproducing the information signals from such tracks upon successive enablings of the transducer means, means disposed relative to the recording medium and operative concurrently with said transducer means in accordance with the enabling of the transducer means for obtaining a recording by by said transducer means of reference signals in the pair of transversely displaced tracks on the moving recording medium and for obtaining a reproduction of such signals by the transducer means in accordance with the enabling of the transducer means, means coupled to said transducer means for separating the reference signals from the information signals, means coupled to said separating means for comparing the timing of the reference signals in the two sets of reference signals and for producing a signal having variable characteristics in accordance with the difference in timing, and means coupled to said comparing means for adjusting the disposition of said transducer means relative to the recording medium in accordance with the adjustable signal from said comparing means.

10. In a system for recording and reproducing information signals on a recording medium movable in a longitudinal direction, transducer means adjustably disposed relative to the recording medium in a direction transverse to the longitudinal direction and for recording the information signals on the moving recording medium upon successive enablings of the transducer means and for reproducing the information signals from the moving recording medium upon successive enablings of the transducer means, means disposed relative to the recording medium and operative concurrently with said transducer means for obtaining a recording by said transducer means of two sets of reference signals on the recording medium at displaced positions in the transverse direction in accordance with the successive enablings of the transducer means and for obtaining a reproduction of such signals by the transducer means in accordance with the successive enablings of the transducer means, means coupled to said transducer means for comparing the timing of the reference signals in the two sets of reference signals and for producing a control signal having variable characteristics in accordance with any difference in timing of the reference signals, means coupled to said comparing means for adjusting the disposition of said transducer means relative to said recording medium in the longitudinal direction in accordance with variations in the characteristics of the control signal from said comparing means, means coupled to said transducer means for recognizing any variation in the timing of the reference signals in one of the sets of reference signals, and means coupled to said recognizing means for adjusting the speed of the moving recording medium in the longitudinal direction in accordance with the recognized variation in the timing of the reference signals from said recognizing means.

References Cited in the file of this patent

UNITED STATES PATENTS

| | | |
|---|---|---|
| 2,683,856 | Kornei | July 13, 1954 |
| 2,709,204 | Holmes | May 24, 1955 |
| 2,751,439 | Burton | June 19, 1956 |
| 2,762,861 | Somers | Sept. 11, 1956 |
| 2,794,066 | Mullin | May 28, 1957 |
| 2,878,321 | Davis | Mar. 17, 1959 |
| 2,902,251 | Oncley | Sept. 1, 1959 |
| 2,921,989 | Serrell | Jan. 19, 1960 |
| 2,937,239 | Garber | May 17, 1960 |

FOREIGN PATENTS

| | | |
|---|---|---|
| 762,699 | Great Britain | Dec. 5, 1956 |